United States Patent [19]
Todoroki

[11] Patent Number: 5,465,267
[45] Date of Patent: Nov. 7, 1995

[54] ERROR-CORRECTING TANDEM ENCODING SYSTEM

[75] Inventor: Toshiya Todoroki, Tokyo, Japan

[73] Assignee: NEC Corporation, Japan

[21] Appl. No.: 176,394

[22] Filed: Dec. 30, 1993

[30] Foreign Application Priority Data

Jan. 5, 1993 [JP] Japan .................................. 5-000344

[51] Int. Cl.$^6$ .................................................. H04L 27/06
[52] U.S. Cl. .......................... 375/279; 375/329; 375/341; 371/37.5; 371/43; 370/12; 370/69.1
[58] Field of Search .................................. 375/39, 52, 57, 375/67, 83, 94; 371/37.4, 37.5, 43; 370/12, 18, 19, 69.1, 77, 110.1

[56] References Cited

U.S. PATENT DOCUMENTS

| | | | |
|---|---|---|---|
| 3,988,677 | 10/1976 | Fletcher et al. | 371/37.5 |
| 4,757,495 | 7/1988 | Decker et al. | 370/69.1 |
| 4,907,233 | 3/1990 | Deutsch et al. | 371/43 |
| 5,117,427 | 5/1992 | Miyake et al. | 371/37.4 |
| 5,259,003 | 11/1993 | Berger et al. | 371/43 |

*Primary Examiner*—Stephen Chin
*Assistant Examiner*—Don Vo
*Attorney, Agent, or Firm*—Ostrolenk, Faber, Gerb & Soffen

[57] ABSTRACT

An error-correcting tandem encoding system includes a transmitter section and a receiver section. The transmitter section comprises a multiplexer for multiplexing data and voice signals supplied thereto, a Reed-Solomon encoder for Reed-Solomon-encoding an output signal from the multiplexer while interleaving the output signal without causing a delay, a convolutional encoder for convolutionally encoding a Reed-Solomon encoded signal from the Reed-Solomon encoder, and a PSK modulator having a fixed bit rate for phase-shift-keying an output signal from the convolutional encoder. The receiver section comprises a PSK demodulator having a fixed bit rate for demodulating a phase-shift-keyed signal supplied thereto, a Viterbi decoder for decoding a demodulated output signal from the PSK demodulator based on a Viterbi algorithm, a deinterleaver for deinterleaving a decoded output signal from the Viterbi decoder, a Reed-Solomon decoder for decoding a deinterleaved output signal from the deinterleaver, a first separator for separating voice and data signals from a decoded output signal from the Reed-Solomon decoder, a second separator for extracting a voice signal from the decoded output signal from the Viterbi decoder, and a selector for selecting the voice signal separated by the first separator or the voice signal extracted by the second separator.

2 Claims, 9 Drawing Sheets

ERROR-CORRECTING TANDEM ENCODING SYSTEM

BACKGROUND OF THE INVENTION

1. Field of the Invention

The present invention relates to an error-correcting tandem encoding system for digital radio communications, and more particularly to an error-correcting tandem encoding system for digital radio communications including data and voice communications.

2. Description of the Prior Art

Figure 1:
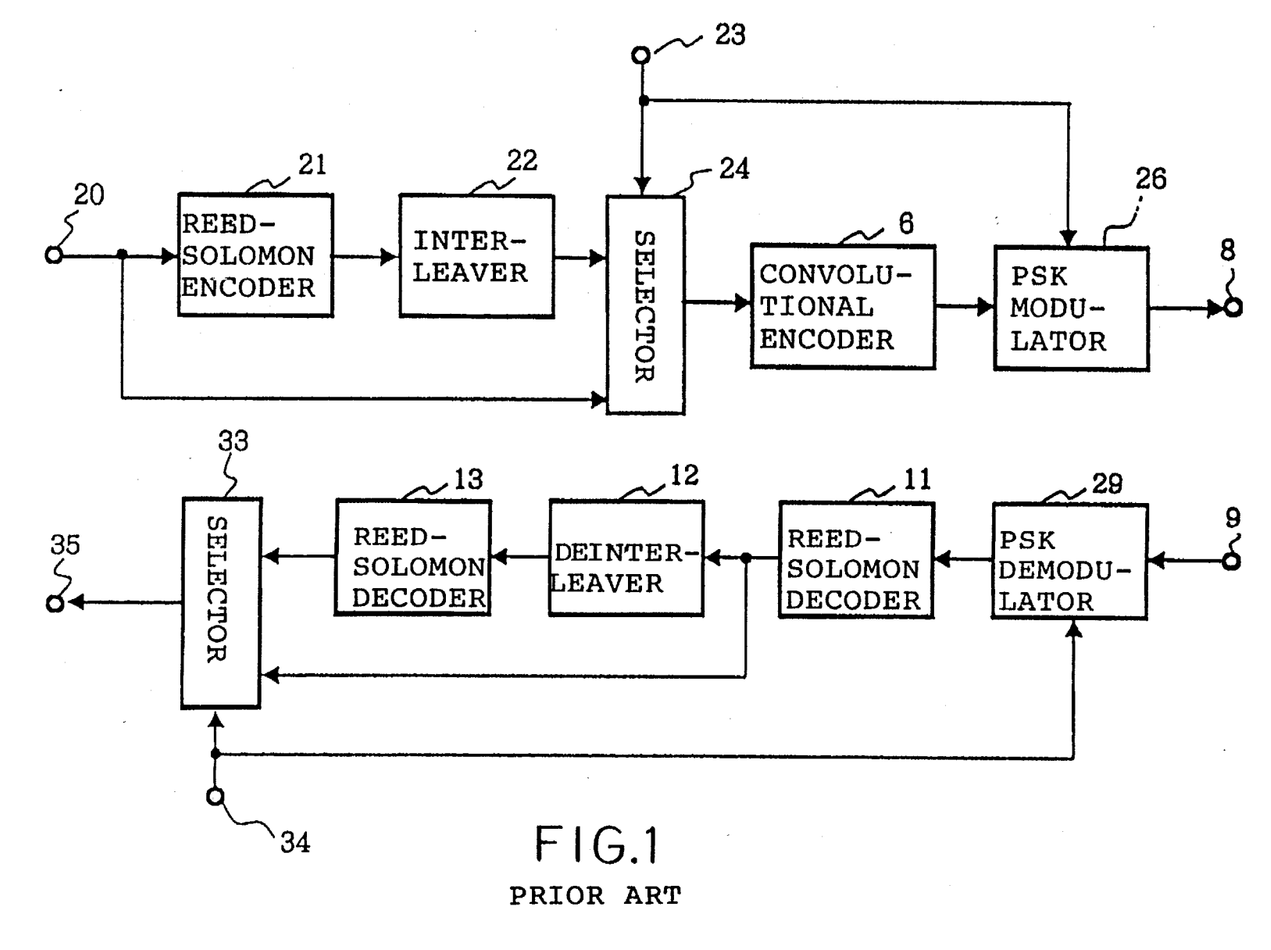
FIG. 1 is a block diagram of a conventional error-correcting tandem encoding system.
Figure 2A:
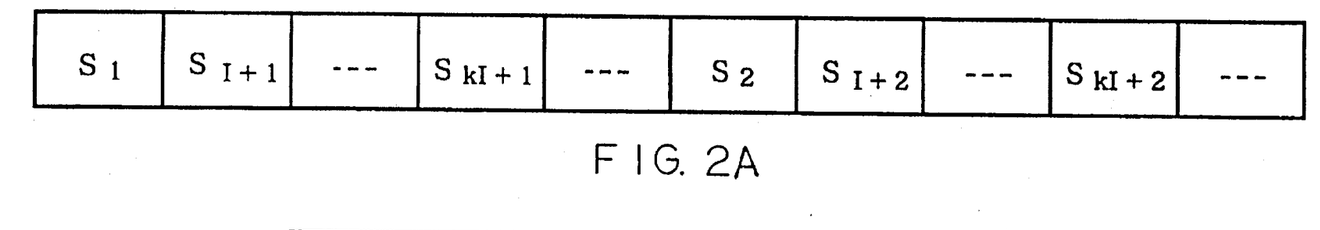
FIGS. 2A and 2B are diagrams showing a time-series input signal of a Reed-Solomon encoder of the error-correcting tandem encoding system shown in FIG. 1 and code words that are generated thereby.
Figure 2B:
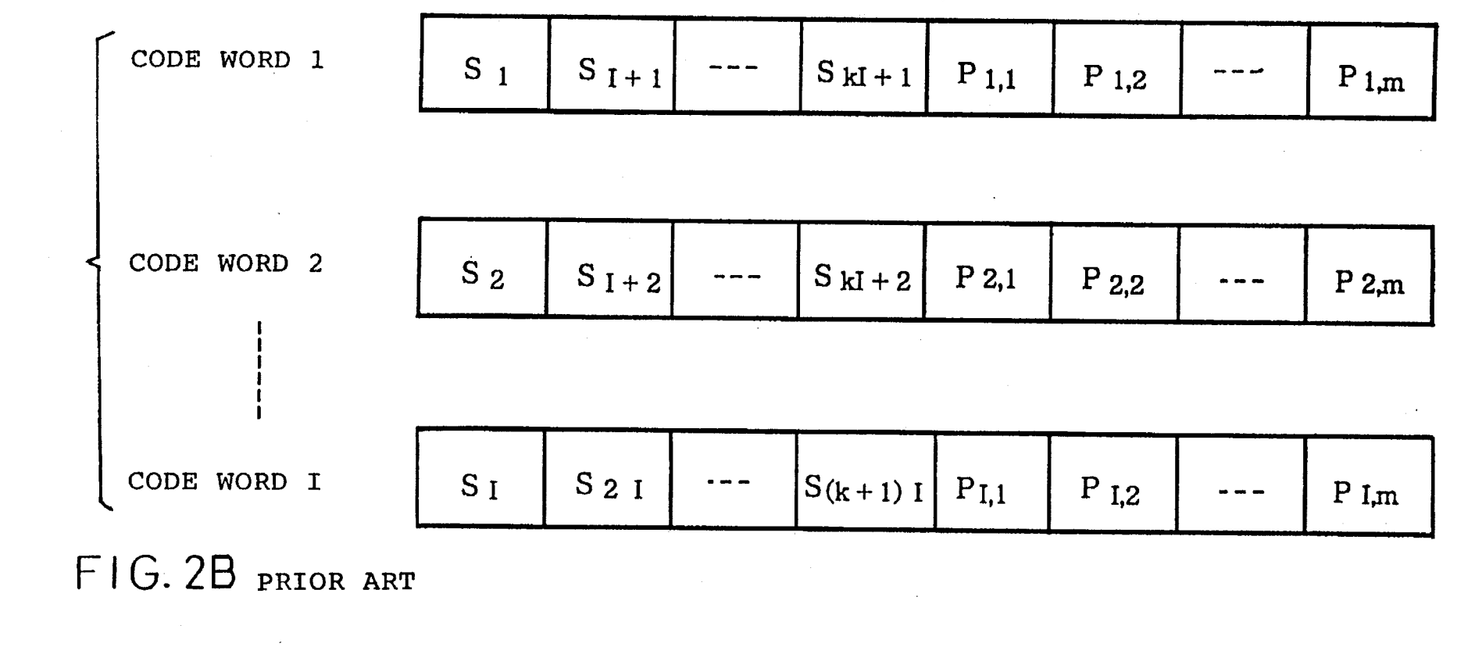
Figure 3:
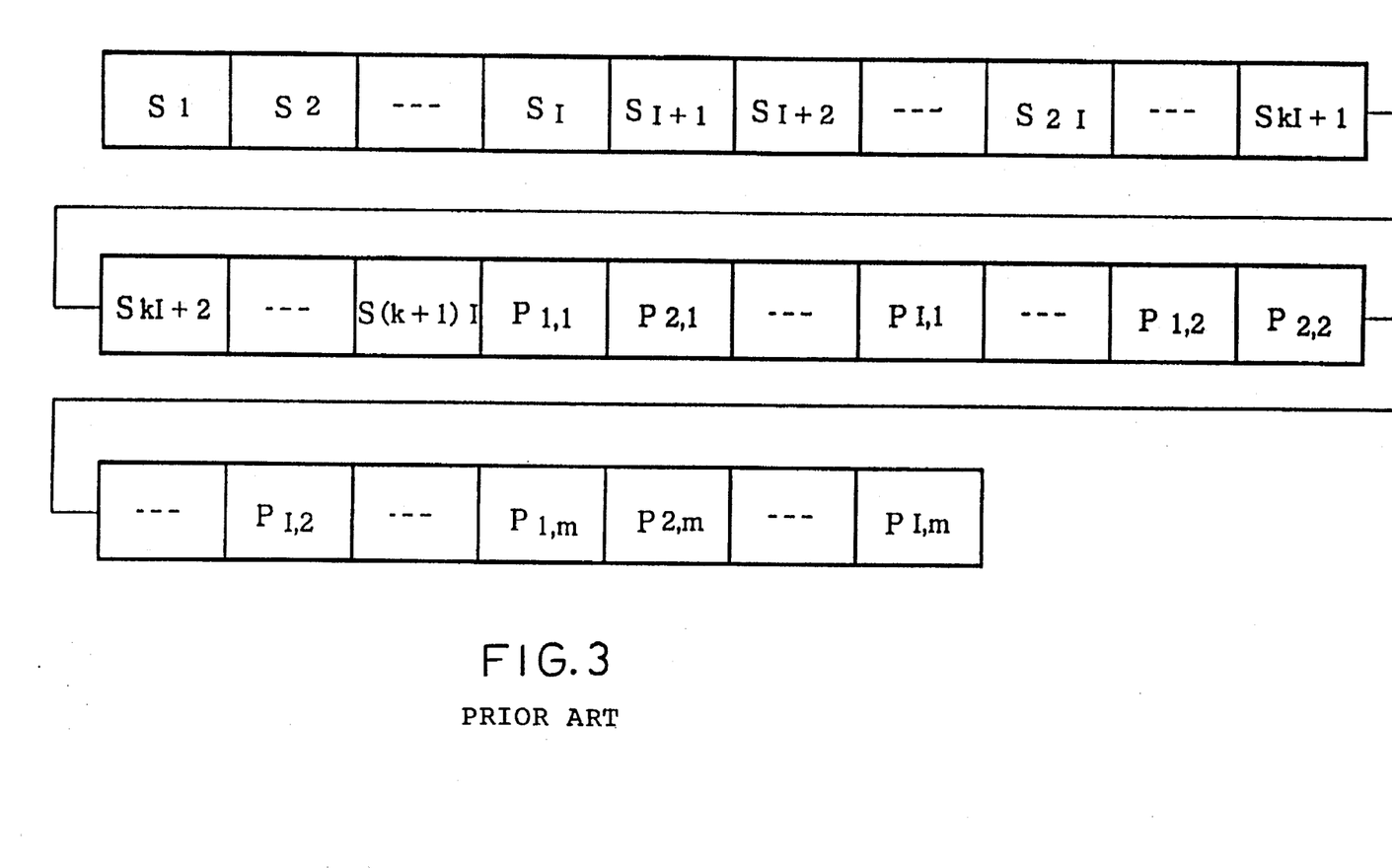
FIG. 3 is a diagram showing a time-series output signal from an interleaver of the error-correcting tandem encoding system shown in FIG. 1.

FIG. 1 of the accompanying drawings shows in block form a conventional error-correcting tandem encoding system as disclosed in Japanese laid-open patent publication No. 195732/90. FIGS. 2A and 2B of the accompanying drawings show a time-series input signal of a Reed-Solomon encoder of the error-correcting tandem encoding system shown in FIG. 1 and code words that are generated thereby. FIG. 3 of the accompanying drawings shows a time-series output signal from an interleaver of the error-correcting tandem encoding system shown in FIG. 1.

The error-correcting tandem encoding system shown in FIG. 1 includes a transmitter section and a receiver section. The transmitter section comprises an input terminal 20 for receiving digital data to be transmitted, a Reed-Solomon encoder 21, an interleaver 22, a control signal input terminal 23, a selector 24, a convolutional encoder 6, a phase-shift keying (PSK) modulator 26 whose bit rate is variable by a control signal, and an output terminal 8 for outputting an intermediate-frequency (IF) signal. The receiver section comprises an input terminal 9 for receiving an IF signal, a PSK demodulator 29 whose bit rate is variable by a control signal, a Viterbi decoder 11, a deinterleaver 12, a Reed-Solomon decoder 13, a selector 33, a control signal input terminal 34, and an output terminal 35 for outputting decoded digital data.

Operation of the error-correcting tandem encoding system shown in FIG. 1 will be described below. The error-correcting tandem encoding system shown in FIG. 1 employs a convolutional code as an internal code and a Reed-Solomon code as an external code. If an input signal supplied from the input terminal 20 is a data signal of a computer, for example, the input data signal is then Reed-Solomon-encoded by the Reed-Solomon encoder 21. The Reed-Solomon-encoded digital data are block-interleaved by the interleaver 22. Specifically, a series of information symbols as shown in FIG. 2A is supplied to the Reed-Solomon encoder 21, which generates I code words 1 through I as shown in FIG. 2B. In FIG. 2B, Pi,j represents a jth check symbol for a code word i. The code word data are then supplied to and outputted from the interleaver 22 such that they are of a time series as shown in FIG. 3.

In response to a control signal from the control signal input terminal 23, the selector 24 selects and outputs the input signal from the input terminal 20 if the input signal is used in voice communications, and selects and outputs the output signal from the interleaver 22 if the input signal is used in computer communications.

When the Reed-Solomon encoder 21 and the interleaver 22 are bypassed, since no check symbol is added, the bit rate of the data inputted to the convolutional encoder 6 is varied. Therefore, the PSK modulator 26 has a variable bit rate. The bit rate of the PSK modulator 26 is varied by the control signal so as to cope with a variation in the bit rate of the supplied data. The receiver section shown in the lower half of FIG. 1 operates in a manner which is the exact reverse of the transmitter section. Therefore, operation of the receiver section will not be described below.

In the conventional error-correcting tandem encoding system, the input data pass through the Reed-Solomon encoder 21 for data communications but, in order to reduce decoding delay, the input data do not pass through the Reed-Solomon encoder 21 for voice communications. Consequently, the PSK modulator 26 of the transmitter section is required to vary its bit rate to cope with the different bit rates of the data. The PSK demodulator 29 of the receiver section is also required to vary its bit rate to cope with the different bit rates of the data. However, the conventional system is unable to satisfy the requirements for a case in which the sound quality of voice data to be received is of critical importance and a decoding delay causes no problem with respect to voice data. In addition, the conventional system fails to transmit voice and data signals simultaneously.

SUMMARY OF THE INVENTION

It is an object of the present invention to provide an error-correcting tandem encoding system which includes a PSK modulator having a fixed bit rate and which can transmit voice and data signals simultaneously.

Another object of the present invention is to provide an error-correcting tandem encoding system which includes a PSK demodulator having a fixed bit rate and which can improve the sound quality of voice data to be received only in voice communications for which a decoding delay causes no problem with respect to such voice data.

Still another object of the present invention is to provide an error-correcting tandem encoding system which has a PSK modulator and a PSK demodulator that both have fixed bit rates, which can transmit voice and data signals simultaneously, and which can improve the sound quality of voice data to be received only in voice communications for which a decoding delay causes no problem with respect to such voice data.

To achieve the above objects, there is provided in accordance with the present invention an error-correcting tandem encoding system comprising multiplexer means for multiplexing data and voice signals supplied thereto, Reed-Solomon encoder means for Reed-Solomon-encoding an output signal from the multiplexer means while interleaving the output signal without causing a delay, convolutional encoder means for convolutionally encoding a Reed-Solomon-encoded signal from the Reed-Solomon encoder means, and phase-shift keying modulator means having a fixed bit rate for phase-shift-keying an output signal from the convolutional encoder means.

According to the present invention, there is also provided an error-correcting tandem encoding system comprising phase-shift-keying demodulator means having a fixed bit rate for demodulating a phase-shift-keyed signal supplied thereto, Viterbi decoder means for decoding a demodulated output signal from the phase-shift-keying demodulator means based on a Viterbi algorithm, deinterleaver means for deinterleaving a decoded output signal from the Viterbi decoder means, Reed-Solomon decoder means for decoding a deinterleaved output signal from the de interleaver means, first separator means for separating voice and data signals from a decoded output signal from the Reed-Solomon decoder means, second separator means for extracting a voice signal from the decoded output signal from the Viterbi decoder means, and selector means for selecting the voice signal separated by the first separator means or the voice signal extracted by the second separator means.

According to the present invention, there is further provided an error-correcting tandem encoding system comprising a transmitter section and a receiver section; the transmitter section comprising multiplexer means for multiplexing data and voice signals supplied thereto, Reed-Solomon encoder means for Reed-Solomon-encoding an output signal from the multiplexer means while interleaving the output signal without causing a delay, convolutional encoder means for convolutionally encoding a Reed-Solomon-encoded signal from the Reed-Solomon encoder means, and phase-shift keying modulator means having a fixed bit rate for phase-shift-keying an output signal from the convolutional encoder means; and the receiver section comprising phase-shift-keying demodulator means having a fixed bit rate for demodulating a phase-shift-keyed signal supplied thereto, Viterbi decoder means for decoding a demodulated output signal from the phase-shift-keying demodulator means based on a Viterbi algorithm, deinterleaver means for deinterleaving a decoded output signal from the Viterbi decoder means, Reed-Solomon decoder means for decoding a deinterleaved output signal from the deinterleaver means, first separator means for separating voice and data signals from a decoded output signal from the Reed-Solomon decoder means, second separator means for extracting a voice signal from the decoded output signal from the Viterbi decoder means, and selector means for selecting the voice signal separated by the first separator means or the voice signal extracted by the second separator means.

In the transmitter section, data and voice signals are multiplexed, Reed-Solomon-encoded, and interleaved without causing a delay. In the receiver section, a signal that has been Viterbi-decoded is deinterleaved, and data and voice signals are separated from a signal that has been Reed-Solomon-decoded. The separated voice signal or a voice signal extracted from the Viterbi-decoded signal is selected and outputted depending on whether or not the voice signal is only to be received. Consequently, the data and voice signals can be transmitted simultaneously with the PSK modulator and demodulator having respective fixed bit rates, and the sound quality of the voice signal that is to be received only can be improved when a decoding delay causes no problem.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 4:
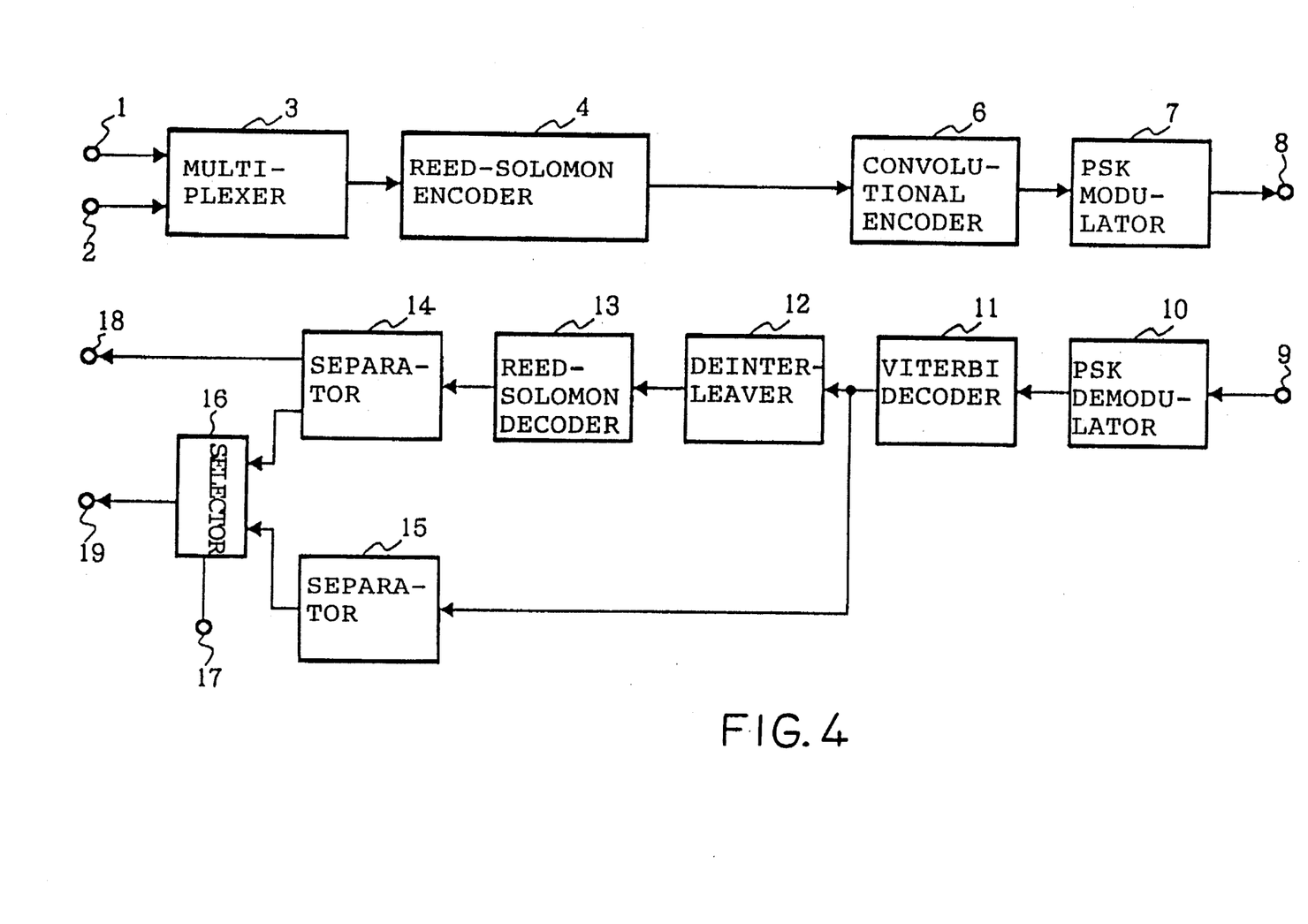
FIG. 4 is a block diagram of an error-correcting tandem encoding system according to the present invention.

As shown in FIG. 4, an error-correcting tandem encoding system according to the present invention includes a transmitter section and a receiver section. The transmitter section comprises an input terminal 1 for receiving a data signal to be transmitted, an input terminal 2 for receiving a voice signal to be transmitted, a multiplexer 3 for multiplexing data and voice signals, a Reed-Solomon encoder 4 with an interleaver for Reed-Solomon-encoding an output signal from the multiplexer 3 while interleaving the signal without causing a delay, a convolutional encoder 6 for convolutionally encoding the Reed-Solomon-encoded signal, a PSK modulator 7 with a fixed bit rate for phase-shift-keying an output signal from the convolutional encoder 6, and an output terminal 8 for transmitting an output signal from the PSK modulator 7. The receiver section comprises an input terminal 9 for receiving an IF signal, a PSK demodulator 10 with a fixed bit rate, a Viterbi decoder 11 for decoding demodulated output data from the PSK demodulator 10 based on a Viterbi algorithm, a deinterleaver 12 for deinterleaving an output signal from the Viterbi decoder 11, a Reed-Solomon decoder 13 for decoding an output signal from the deinterleaver 12, a separator 14 for separating voice and data signals from an output signal from the Reed-Solomon decoder 13 and outputting the voice and data signals, a separator 15 for separating a voice signal from the output signal from the Viterbi decoder 11, a control signal input terminal 17, a selector 16 for selecting one of the voice signals outputted from the separators 14, 15 based on a control signal from the control signal input terminal 17, an output terminal 18 for outputting the data signal, and an output terminal 19 for outputting the voice signal.

Figure 5:
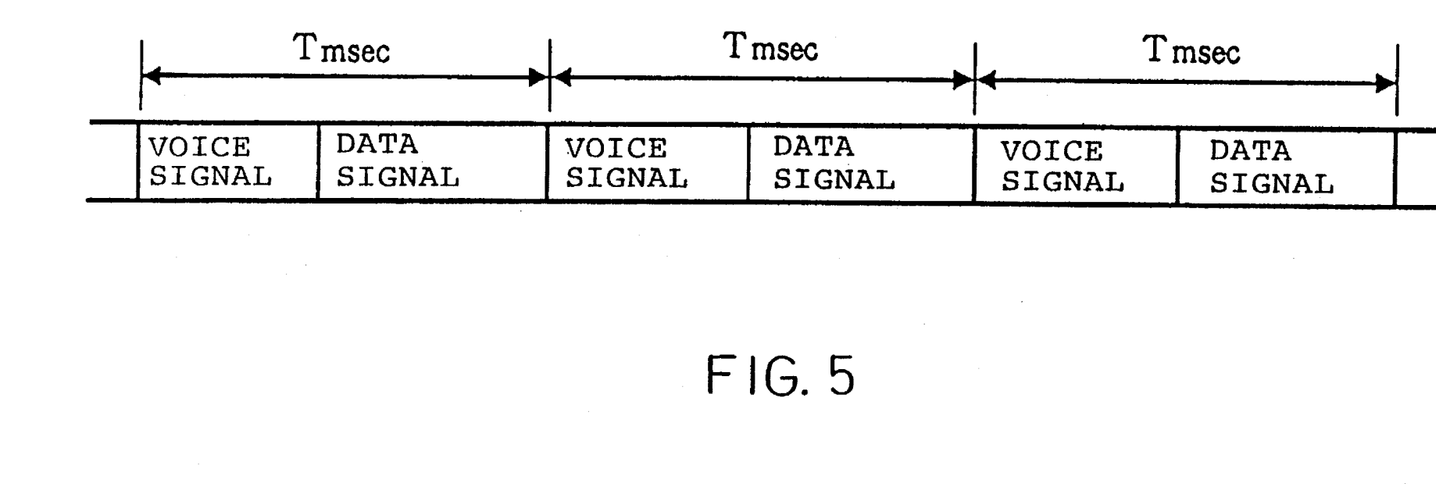
FIG. 5 is a timing chart of a multiplex signal of the error-correcting tandem encoding system shown in FIG. 4.
Figure 6A:
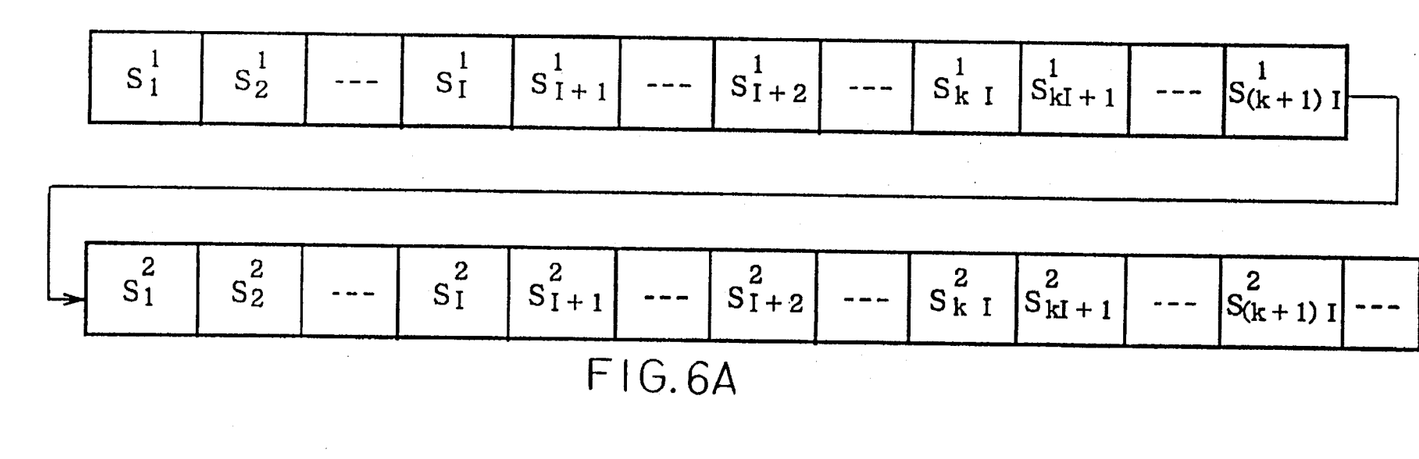
FIGS. 6A and 6B are diagrams showing a time-series input signal of a Reed-Solomon encoder with an interleaver of the error-correcting tandem encoding system shown in FIG. 1 and code words that are generated thereby.
Figure 6B:
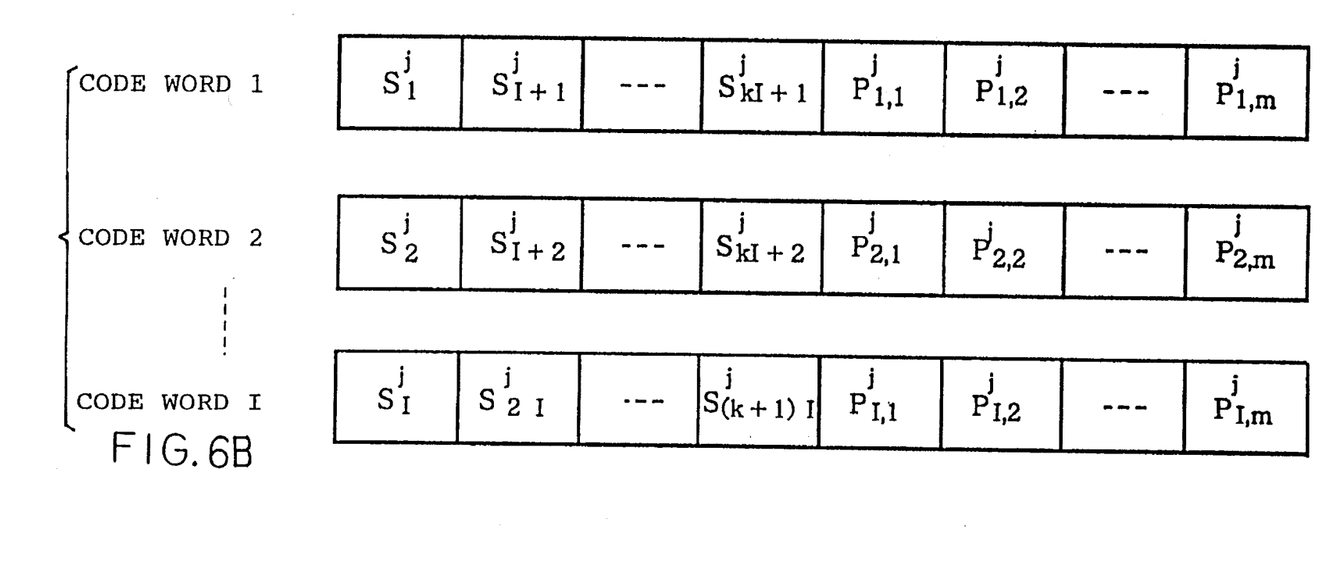
Figure 7:
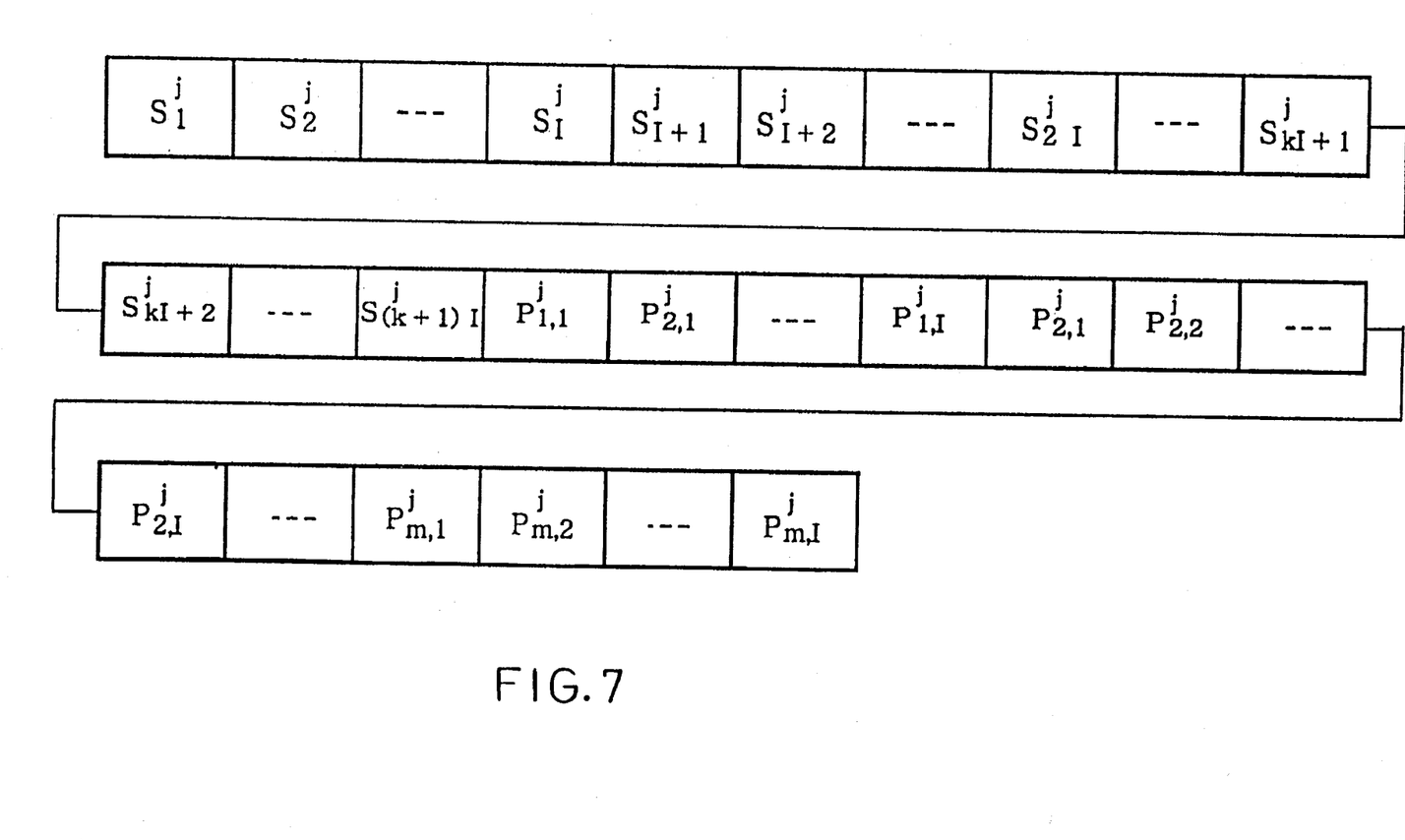
FIG. 7 is a diagram showing a time-series output signal from the Reed-Solomon encoder with an interleaver of the error-correcting tandem encoding system shown in FIG. 4.

The error-correcting tandem encoding system shown in FIG. 4 operates as follows:

In the transmitter section, the multiplexer 3 is supplied with a data signal from the input terminal 1 and a voice signal from the input terminal 2, and multiplexes the supplied data and voice signals in each T msec as shown in FIG. 5. A time-series multiplex signal produced by the multiplexer 3 is supplied to the Reed-Solomon encoder 4 with an interleaver in a sequence shown in FIG. 6A where j of $S_i^j$ indicates the number of a group divided by each T msec. The Reed-Solomon encoder 4 with an interleaver generates I code words 1 through I in respective T msec. as shown in FIG. 6B, and outputs them in a time series as shown in FIG. 7. The outputted signal from the Reed-Solomon encoder 4 with an interleaver is composed of an interleaved pattern of code words 1 through I, but contains substantially no delay due to encoding. In FIG. 7, $P_{hi}{}^j$ represents the ith check symbol of a code word h of a group j, and each code word constitutes a Reed-Solomon code where the number of information symbols is k and the number of check symbols is m.

The convolutional encoder 6 convolutionally encodes the outputted signal from the Reed-Solomon encoder 4 with an interleaver, and the PSK modulator 7 modulates an output signal from the convolutional encoder 6 by way of phase-shift keying and outputs the modulated signal through the output terminal 8.

Figure 8:
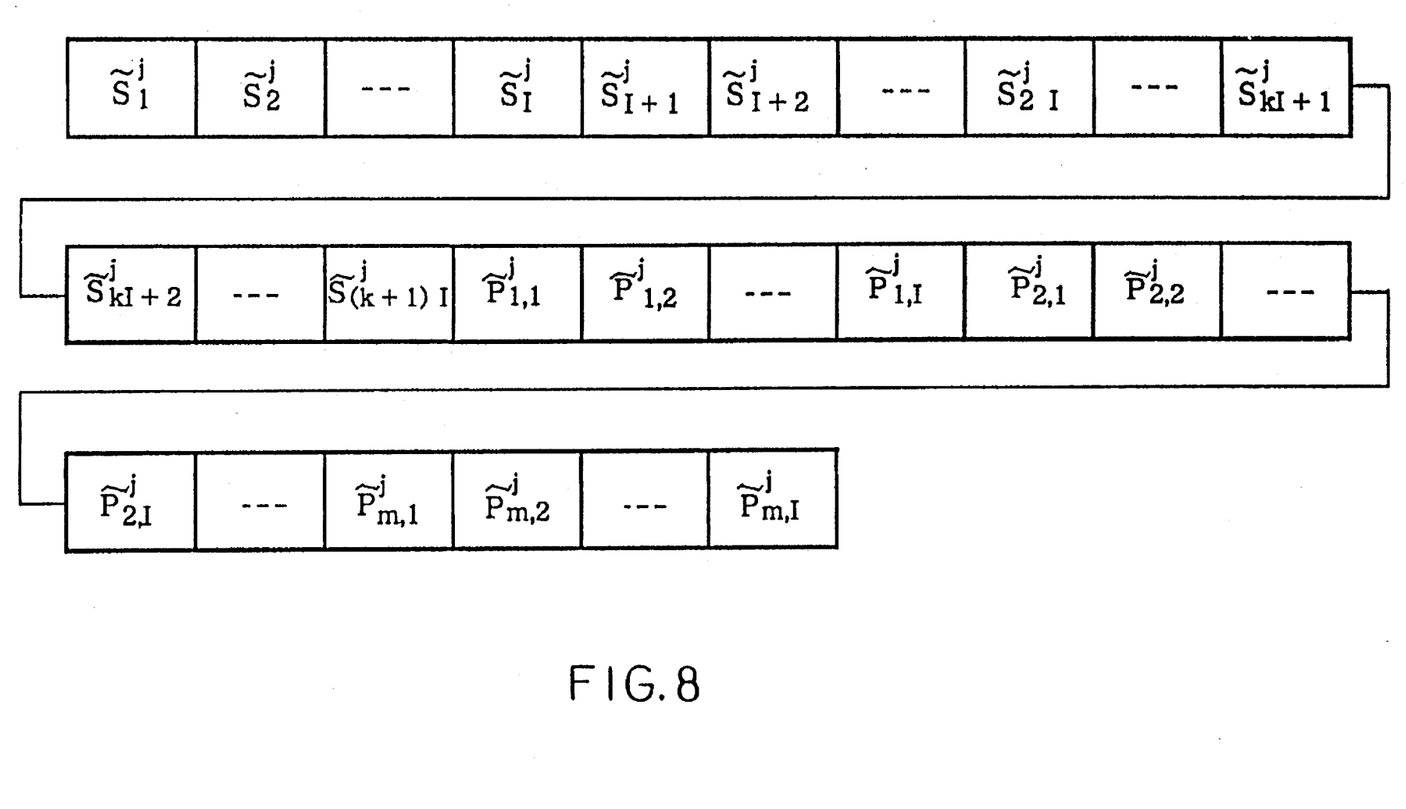
FIG. 8 is a diagram showing a time-series output signal from a Viterbi decoder of the error-correcting tandem encoding system shown in FIG. 4.

In the receiver section, the PSK demodulator 10 demodulates a received PSK-modulated signal supplied from the input terminal 9. The demodulated signal is a convolutionally encoded signal which contains an error due to noise produced in the transmission path. The Viterbi decoder 11 decodes the demodulated signal from the PSK demodulator 10. The Viterbi decoder 11 produces a decoded output signal as shown in FIG. 8 which contains groups divided by respective T msec. In FIG. 8, $\tilde{S}$ and $\tilde{P}$ represent estimated values of information and symbol values, respectively. Speech and data signals can be extracted from the decoded output signal from the Viterbi decoder 11.

Generally, a digital voice signal is relatively resistant to transmission errors, and can be adequately transmitted for communications even when the bit error ratio (BER) ranges from $10^{-2}$ to $10^{-3}$. If a decoding delay poses a problem, as in telephone communications, the voice signal separated from the output signal from the Viterbi decoder 11 by the separator 15 is then selected by the selector 16 and outputted through the output terminal 19.

Figure 9:
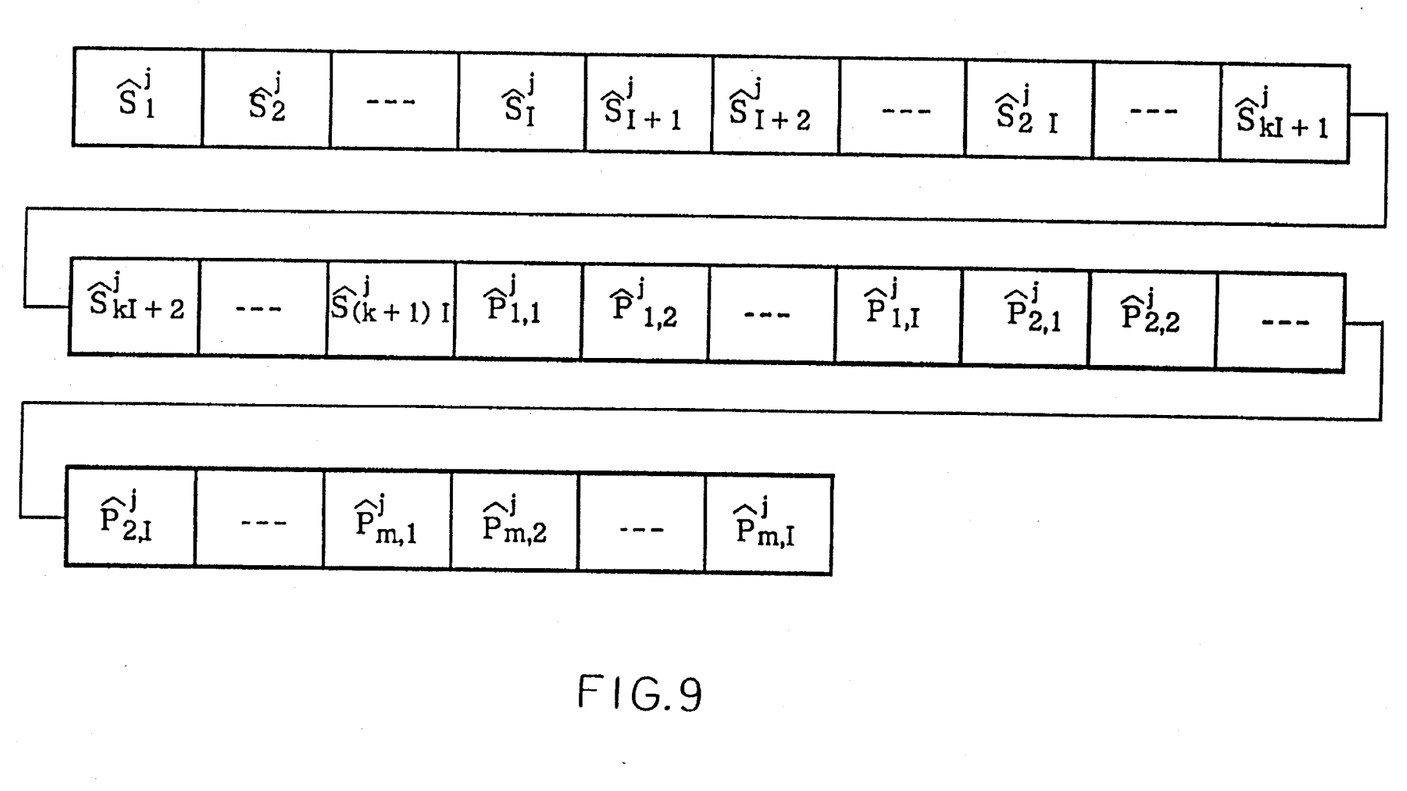
FIG. 9 is a diagram showing a time-series output signal from a Reed-Solomon decoder of the error-correcting tandem encoding system shown in FIG. 4.

While data signals for use in computers must be highly reliable, a decoding delay poses no problem for such data signals. Therefore, the output signal from the Viterbi decoder 11 is supplied to the deinterleaver 12, which supplies a deinterleaved signal to the Reed-Solomon decoder 13. The Reed-Solomon decoder 13 reconstructs and decodes I code words and outputs an estimated value $\bar{S}$ which is more reliable than the estimated value $\tilde{S}$. The separator 14 separates a data signal from the output signal from the Reed-Solomon decoder 13 which is composed of groups divided by T msec., as shown in FIG. 9, and outputs the data signal through the output terminal 18. When a voice signal that is to be received only is transmitted, a decoding delay poses no problem and it is better to output the voice signal with improved sound quality. Therefore, a voice signal that is separated from the data signal by the separator 14 is selected by the selector 16 and outputted through the output terminal 19.

Although a certain preferred embodiment of the present invention has been shown and described in detail, it should be understood that various changes and modifications may be made therein without departing from the scope of the appended claims.

What is claimed is:

1. An error-correcting tandem system comprising a transmitter section and a receiver section;

said transmitter section comprising:

multiplexer means for multiplexing data and voice signals supplied thereto;

Reed-Solomon encoder means for Reed-Solomon-encoding an output signal from said multiplexer means while interleaving the output signal without causing a delay;

convolutional encoder means for convolutionally encoding a Reed-Solomon encoded signal from said Reed-Solomon encoder means; and phase-shift keying modulator means having a fixed bit rate for phase-shift-keying an output signal from said convolutional encoder means;

said receiver section comprising:

phase-shift-keying demodulator means having a fixed bit rate for demodulating a phase-shift-keyed signal supplied thereto;

Viterbi decoder means for decoding a demodulated output signal from said phase-shift-keying demodulator means based on a Viterbi algorithm;

deinterleaver means for deinterleaving a decoded output signal from said Viterbi decoder means;

Reed-Solomon decode means for decoding a deinterleaved output signal from said deinterleaver means;

first separator means for separating voice and data signals from a decoded output signal from said Reed-Solomon decoder means;

second separator means for extracting a voice signal from the decoded output signal from said Viterbi decoder means; and selector means for selecting the voice signal extracted by said second separator means when a decoding delay poses a problem, and for selecting the voice signal separated by said first separator means when a decoding delay poses no problem.

2. An error-correcting tandem decoding system comprising:

phase-shift-keying demodulator means having a fixed bit rate for demodulating a phase-shift-keyed signal supplied thereto;

Viterbi decoder means for decoding a demodulated output signal from said phase-shift-keying demodulator means based on a Viterbi algorithm;

deinterleaver means for deinterleaving a decoded output signal from said Viterbi decoder means;

Reed-Solomon decoder means for decoding a deinterleaved output signal from said deinterleaver means;

first separator means for separating voice and data signals from a decoded output signal from said Reed-Solomon decoder means;

second separator means for extracting a voice signal from the decoded output signal from said Viterbi decoder means; and selector means for selecting the voice signal extracted by said second separator means when a decoding delay poses a problem, and for selecting the voice signal separated by said first separator means when a decoding delay poses no problem.

* * * * *